United States Patent
Liang et al.

(10) Patent No.: US 10,882,011 B2
(45) Date of Patent: Jan. 5, 2021

(54) COMPOSITE HOLLOW FIBER MEMBRANE

(71) Applicant: National University of Singapore, Singapore (SG)

(72) Inventors: Canzeng Liang, Singapore (SG); Tai-Shung Chung, Singapore (SG)

(73) Assignee: National University of Singapore, Singapore (SG)

(*) Notice: Subject to any disclaimer, the term of this patent is extended or adjusted under 35 U.S.C. 154(b) by 175 days.

(21) Appl. No.: 16/037,443

(22) Filed: Jul. 17, 2018

(65) Prior Publication Data

US 2019/0015796 A1 Jan. 17, 2019

(30) Foreign Application Priority Data

Jul. 17, 2017 (SG) .............................. 10201705847

(51) Int. Cl.
| | |
|---|---|
| *B01D 71/70* | (2006.01) |
| *B01D 69/12* | (2006.01) |
| *B01D 53/22* | (2006.01) |
| *B01D 69/08* | (2006.01) |
| *B01D 69/02* | (2006.01) |
| *B01D 67/00* | (2006.01) |

(52) U.S. Cl.
CPC ............ *B01D 71/70* (2013.01); *B01D 53/228* (2013.01); *B01D 69/02* (2013.01); *B01D 69/08* (2013.01); *B01D 69/125* (2013.01); *B01D 67/0009* (2013.01); *B01D 67/0011* (2013.01); *B01D 69/12* (2013.01); *B01D 2053/224* (2013.01); *B01D 2256/10* (2013.01); *B01D 2257/504* (2013.01); *B01D 2257/7022* (2013.01); *B01D 2323/30* (2013.01); *B01D 2325/34* (2013.01)

(58) Field of Classification Search
CPC .. B01D 53/22; B01D 53/228; B01D 67/0009; B01D 67/0011; B01D 69/08; B01D 69/12; B01D 69/125; B01D 71/70; B01D 2323/30; B01D 2325/34; C08L 3/04; C08L 3/06
See application file for complete search history.

(56) References Cited

U.S. PATENT DOCUMENTS

| | | | | |
|---|---|---|---|---|
| 4,230,463 A | * | 10/1980 | Henis ..................... | B01D 53/22 210/500.23 |
| 4,243,701 A | * | 1/1981 | Riley ................. | B01D 67/0009 427/244 |
| 4,980,235 A | * | 12/1990 | Scheer .................. | B01D 69/12 427/243 |
| 2019/0351372 A1 | * | 11/2019 | Burtovyy ............... | B01D 71/70 |

* cited by examiner

*Primary Examiner* — Jason M Greene
(74) *Attorney, Agent, or Firm* — Cesari and McKenna, LLP

(57) ABSTRACT

There is provided a composite hollow fiber membrane for gas and vapour separation comprising: a porous membrane substrate; and a selective layer of cross-linked polydimethylsiloxane (PDMS) provided on a surface of the porous membrane substrate, wherein the molecular weight of the cross-linked PDMS is ≥100 kg/mol. There is also provided a method of forming the composite hollow fiber membrane, and a method of forming the cross-linked polydimethylsiloxane (PDMS) having a molecular weight ≥100 kg/mol.

17 Claims, 8 Drawing Sheets

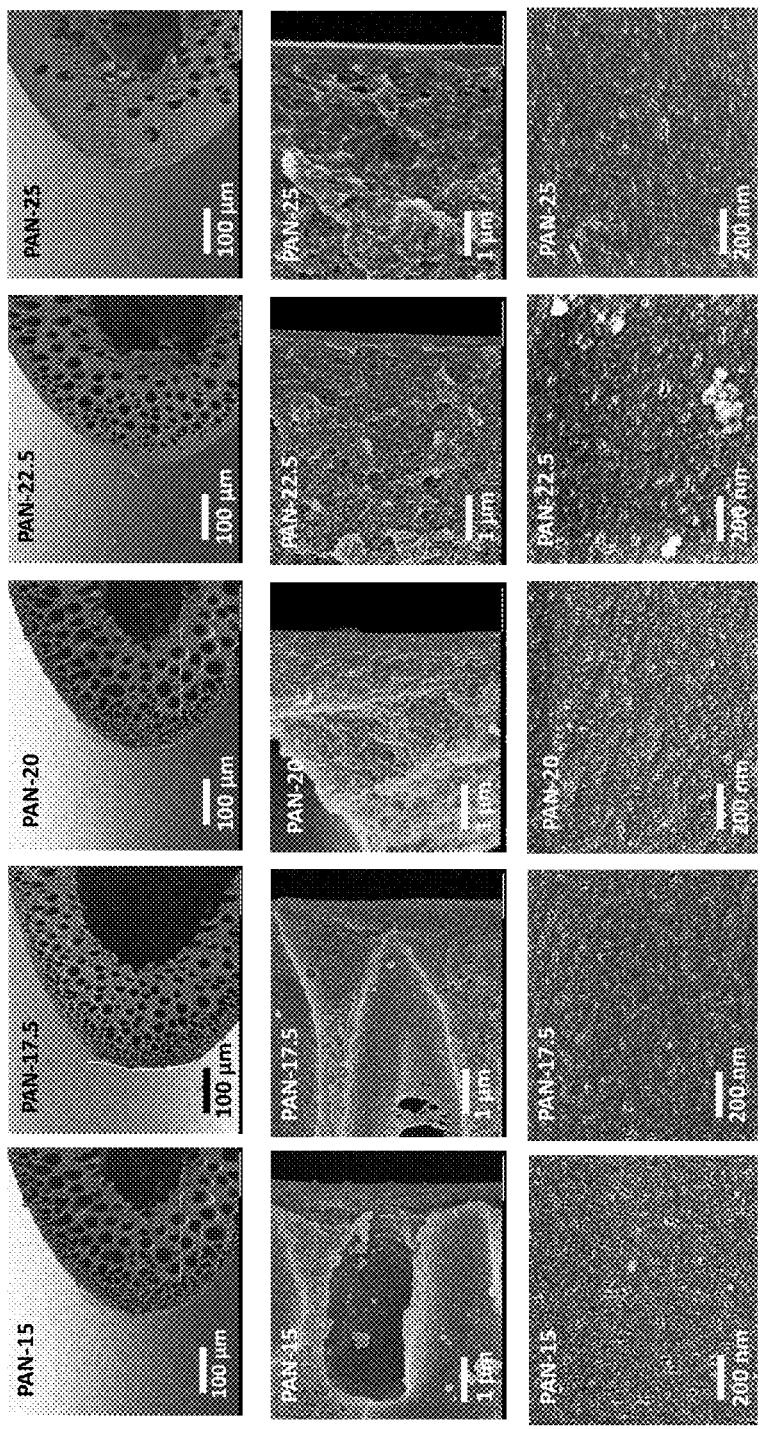

COMPOSITE HOLLOW FIBER MEMBRANE

CROSS-REFERENCE TO RELATED APPLICATION

This application claims priority from Singaporean patent application no. SG10201705847P, filed on Jul. 17, 2017.

TECHNICAL FIELD

The present invention relates to a composite hollow fiber membrane and a method of preparing the same.

BACKGROUND

Membrane-based technologies for gas separation have advantages of simplicity, high-energy efficiency, small carbon footprint, cost competitiveness and environmental friendliness as compared to energy-intensive separation processes such as cryogenic separation, distillation and absorption. In particular, hollow fiber membranes have several distinct advantages over flat-sheet membranes for gas separation, such as self-supporting characteristic, high surface-to-volume ratio and ease to scale up.

Polydimethylsiloxane (PDMS) is the primary membrane material used in industry for the recovery of organic vapors from permanent gases such as air and nitrogen ($N_2$) because PDMS is one of the most permeable polymers due to its flexible siloxane linkages evidenced by its extremely low glass transition temperature (−129° C.). In practical applications, high-flux and defect-free (selective) membranes are necessary in order to achieve an effective and economical separation. It demands a thin selective layer to obtain a high permeance.

One way to minimize the thickness of the selective layer is to produce a thin film composite (TFC) membrane, which consists of a thin dense selective layer supported by a porous substrate. Although the existing PDMS composite membranes have achieved relatively high permeance and moderate selectivity, further improvement in permeance is imperative for making membrane separation more competitive with the traditional separation techniques. A typical and effective technique to fabricate TFC membranes is the solution coating process (i.e., dip coating, spinning coating and continuous coating), which has been widely applied. However, the intrusion of the coating solution into the porous substrates is inevitable during the coating process and this results in a significant drop in gas permeance because the intruded polymer increases the effective thickness of the selective layer or the overall transport resistance across the composite membranes.

In order to reduce and minimize the intrusion, presently used methods include: 1) reducing the surface pore sizes of the substrate by annealing; 2) increasing the viscosity of the coating solution by quenching; 3) temporarily sealing the pores of the substrate by pre-wetting; and 4) introducing a gutter or middle layer by guttering. However, these methods are either labor, energy or cost intensive and/or inefficient. There is therefore a need for an improved composite membrane.

SUMMARY OF THE INVENTION

The present invention seeks to address these problems, and/or to provide an improved composite hollow fiber membrane. In general terms, the invention relates to a defect-free composite hollow fiber membrane with high gas permeance comprising highly cross-linked PDMS as the selective layer. In addition, the PDMS may have a very high molecular weight.

The present invention also relates to a highly cross-linked PDMS formed from a post cross-linking method, as well as a method of forming the composite hollow fiber membrane using the PDMS formed from the post cross-linking method. In particular, the highly cross-linked PDMS may be directly coated onto a surface of a membrane substrate to form the composite hollow fiber membrane. The resultant defect-free composite membrane has tremendously high gas permeance.

According to a first aspect, the present invention provides a composite hollow fiber membrane for gas and vapour separation comprising:
    a porous membrane substrate; and
    a selective layer of cross-linked polydimethylsiloxane (PDMS) provided on a surface of the porous membrane substrate, wherein the molecular weight of the cross-linked PDMS is 100 kg/mol.

According to a particular aspect, the cross-linked PDMS may have a concentration of ≥0.25 weight %.

The selective layer may have a suitable thickness. In particular, the selective layer of cross-linked PDMS may have a thickness of ≤3 μm.

The composite hollow fiber membrane may comprise any suitable porous membrane substrate. In particular, the porous membrane substrate may comprise, but is not limited to: polyacrylonitrile (PAN), polyethersulfone (PES), polysulfone (PSf), cellulose acetate (CA), polyvinylidene fluoride (PVDF), or copolymers thereof.

According to a particular aspect, the composite hollow fiber membrane may have: a $O_2$ permeance of ≥1,000 GPU; a $CO_2$ permeance of ≥5,000 GPU; a selectivity of $O_2/N_2$ of about 2 at a temperature of 25° C. and pressure of 2 bar; and/or a selectivity of $CO_2/N_2$ of about 11 at a temperature of 25° C. and pressure of 2 bar.

According to a second aspect, the present invention provides a method of forming cross-linked polydimethylsiloxane (PDMS) having a molecular weight ≥100 kg/mol, the method comprising:
    mixing a PDMS elastomer base and a cross-linking agent for a first pre-determined period of time at a first pre-determined temperature to form a first mixture;
    heating the first mixture at a second pre-determined temperature for a second pre-determined period of time;
    adding a non-polar organic solvent to the heated mixture to form a solution of partially cross-linked PDMS; and
    stirring the solution of partially cross-linked PDMS for a third pre-determined period of time at a third pre-determined temperature to form a mixture of highly cross-linked PDMS.

According to a particular aspect, the first pre-determined period of time may be 3-10 minutes and the first pre-determined temperature may be 0-50° C.

According to a particular aspect, the second pre-determined period of time may be 3-20 minutes and the second pre-determined temperature may be 50-100° C.

According to a particular aspect, the third pre-determined period of time may be 2 weeks-12 months and the third pre-determined temperature may be 0-40° C.

The non-polar organic solvent may be any suitable solvent for the purposes of the present invention. For example, the non-polar organic solvent may be selected from the group comprising, but not limited to: cyclohexane, hexane, toluene, or a combination thereof.

According to a third aspect, the present invention provides a composite hollow fiber membrane for gas and vapour separation comprising:
providing a cross-linked PDMS solution, wherein the PDMS has a molecular weight ≥100 kg/mol;
providing a porous hollow fiber membrane substrate; and
coating a surface of the porous hollow fiber membrane substrate with the cross-linked PDMS solution.

According to a particular aspect, the cross-linked PDMS solution may be prepared by the method described above. In particular, the concentration of PDMS in the cross-linked PDMS solution may be ≥0.25 weight %.

The coating may be by any suitable method. For example, the coating may comprise, but is not limited to, direct dip coating, spin coating, continuous coating, or a combination thereof.

The method may further comprise drying the coated porous hollow fiber membrane substrate following the coating. The drying may be under suitable conditions. In particular, the drying may be at room temperature for at least 2 days.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIGS. 5A-5C show the evolution of membrane morphology as a function of PAN concentration in which FIG. 5A shows the cross-section, FIG. 5B shows the enlarged cross-section near the outer edge, and FIG. 5C shows the outer surface;

FIG. 8A shows a PAN substrate with spinning condition of PAN/NMP=17.5/82.5 weight % and FIG. 8B shows the structure of the PDMS/PAN composite membrane;

DETAILED DESCRIPTION

Figure 1:
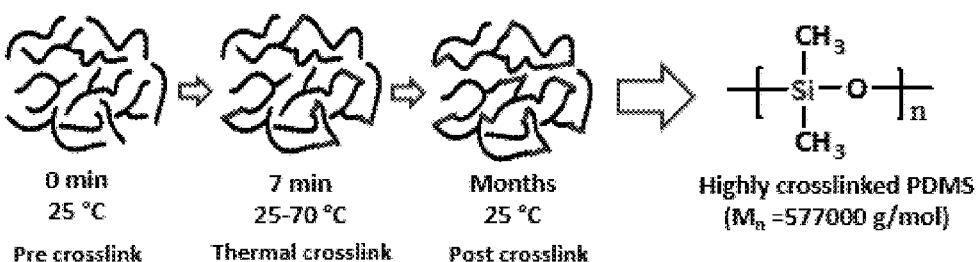
FIG. 1 shows a schematic representation of the preparation of a highly cross-linked PDMS according to one embodiment of the present invention.

As explained above, there is a need for an improved composite membrane which is defect-free with high performance while being reproducible and cost-effective to form.

The present invention relates to a highly cross-linked PDMS, a high-performance composite hollow fiber membrane comprising the highly cross-linked PDMS as a selective layer and a method of forming the membrane. In particular, the membrane comprising the highly cross-linked PDMS has superior gas permeance and strong mechanical properties. The present invention has the advantage of providing a membrane which is reproducible and cost-effective via a simple and scalable method.

Accordingly, the composite hollow fiber membrane of the present invention may be used in many applications such as air separation, paraffin-olefin separation, in the production of oxygen-enriched air, the capture of $CO_2$, the recovery of hydrocarbon vapors and other volatile organic compounds, as well as in air dehumidification and organic volatile compounds separation.

According to a first aspect, the present invention provides a composite hollow fiber membrane for gas and vapour separation comprising:
a porous membrane substrate; and
a selective layer of cross-linked polydimethylsiloxane (PDMS) provided on a surface of the porous membrane substrate, wherein the molecular weight of the cross-linked PDMS is ≥100 kg/mol.

According to a particular aspect, the cross-linked PDMS may be a highly cross-linked PDMS. In particular, the cross-linked PDMS may have a large molecular weight. For example, the molecular weight of the cross-linked PDMS comprised in the composite hollow fiber membrane may be ≥100 kg/mol. In particular, the molecular weight may be ≥500 kg/mol. Even more in particular, the molecular weight may be about 577 kg/mol.

According to a particular aspect, the cross-linked PDMS may have a concentration of ≥0.25 weight %. In particular, the cross-linked PDMS may have a concentration of ≥0.30 weight %.

The selective layer may have a suitable thickness. For example, the selective layer of cross-linked PDMS may have a thickness of ≤3 µm. In particular, the thickness of the selective layer may be 100-1000 nm, 150-950 nm, 200-900 nm, 250-850 nm, 300-800 nm, 350-750 nm, 400-700 nm, 450-650 nm, 500-600 nm. Even more in particular, the thickness of the selective layer may be about 230-260 nm, preferably about 200 nm.

The composite hollow fiber membrane may comprise any suitable porous membrane substrate. In order to improve the performance of the membrane in gas and vapour separation applications, it would be advantageous for at least one surface of the porous membrane substrate on which the selective layer is coated to have a high surface porosity but small surface pores. Accordingly, the surface of the porous membrane substrate on which the selective layer is coated has a surface porosity of ≥70%. According to a particular aspect, the surface of the porous membrane substrate on which the selective layer is coated comprises pores with a suitable average diameter. In particular, the average diameter of each pore may be about 20 nm.

The porous membrane substrate may comprise, but is not limited to: polyacrylonitrile (PAN), polyethersulfone (PES), polysulfone (PSf), cellulose acetate (CA), polyvinylidene fluoride (PVDF), or copolymers thereof. In particular, the porous membrane substrate may be PAN.

The porous membrane substrate may be prepared according to any suitable method. For example, the porous membrane substrate may be prepared by a spinning process, such as dry-wet spinning process, and the like. Suitable conditions may be adopted for the spinning process, which would be apparent to a person skilled in the art in order to form a porous membrane substrate suitable for the purposes of the present invention, such as one having a high surface porosity but small surface pores.

According to a particular embodiment, there is provided a composite hollow fiber membrane comprising a PAN porous membrane substrate and a selective layer coated on a surface of the PAN membrane substrate, wherein the selective layer comprises highly cross-linked PDMS. In particular, the membrane may comprise 0.3 weight % highly cross-linked PDMS and a porous membrane substrate comprising 17.5 weight % PAN. The thickness of the PDMS selective layer may be about 230 nm.

According to another particular embodiment, there is provided a composite hollow fiber membrane comprising a PAN porous membrane substrate and a selective layer coated on a surface of the PAN membrane substrate, wherein the selective layer comprises highly cross-linked PDMS. In particular, the membrane may comprise 0.5 weight % highly cross-linked PDMS and a porous membrane substrate comprising 20 weight % PAN. The thickness of the PDMS selective layer may be about 260 nm.

The composite hollow fiber membrane may be defect-free. As a result, the composite hollow fiber membrane shows high performance, as well as showing high selectivity and high reproducibility. According to a particular aspect, the composite hollow fiber membrane may have: a $O_2$ permeance of ≥1,000 GPU; a $CO_2$ permeance of ≥5,000 GPU; a selectivity of $O_2/N_2$ of about 2 at a temperature of 25° C. and pressure of 2 bar; and/or a selectivity of $CO_2/N_2$ of about 11 at a temperature of 25° C. and pressure of 2 bar.

The composite hollow fiber membrane according to the present invention has improved properties because of the combination of the properties of the porous membrane substrate and the selective layer coated on at least one surface of the porous membrane substrate. For example, the selective layer may comprise highly cross-linked PDMS with a high molecular weight of ≥100 kg/mol. The PDMS may also have a high intrinsic viscosity. Therefore, the present invention also provides a method of forming a highly cross-linked PDMS having a high molecular weight, and high intrinsic viscosity.

According to a second aspect, the present invention provides a method of forming cross-linked polydimethylsiloxane (PDMS) having a molecular weight ≥100 kg/mol, the method comprising:

mixing a PDMS elastomer base and a cross-linking agent for a first pre-determined period of time at a first pre-determined temperature to form a first mixture;

heating the first mixture at a second pre-determined temperature for a second pre-determined period of time;

adding a non-polar organic solvent to the heated mixture to form a solution of partially cross-linked PDMS; and stirring the solution of partially cross-linked PDMS for a third pre-determined period of time at a third pre-determined temperature to form a mixture of highly cross-linked PDMS.

The cross-linked PDMS formed may be a highly cross-linked PDMS. For the purposes of the present invention, highly cross-linked PDMS may be defined as cross-linked PDMS having a molecular weight of ≥100 kg/mol. In particular, the molecular weight may be ≥500 kg/mol. Even more in particular, the molecular weight may be about 577 kg/mol. Further, the cross-linked PDMS may have high inherent viscosity. For example, the inherent viscosity of the highly cross-linked PDMS may be 0.5-2.0 dL/g.

A schematic representation of the method is shown in FIG. 1. In particular, the method of forming PDMS having a molecular weight ≥100 kg/mol may comprise a combination of both thermal cross-linking of PDMS at a high temperature and a subsequent post cross-linking of the PDMS at room temperature. Even more in particular, the PDMS formed from the method of the present invention may have a molecular weight of about 577 kg/mol.

The mixing may comprise mixing the PDMS elastomer base and a cross-linking agent in a suitable weight ratio. In particular, the weight ratio of the PDMS elastomer base to the cross-linking agent may be 10:1.

The cross-linking agent may be any suitable cross-linking agent for the purposes of the present invention. For example, the cross-linking agent may be a reactant comprising a silicon hydrogen functional group (i.e. —H—Si—). In particular, the cross-linking agent may be, but not limited to that as found in Sylgard®184 silicone elastomer kit (Dow Corning).

The first pre-determined period of time may be any suitable time for the purposes of the present invention. In particular, the first pre-determined period of time may be to make the reaction mixture homogeneous. For example, the first pre-determined period of time may be 3-10 minutes. In particular, the first pre-determined period of time may be 4-9 minutes, 5-8 minutes, 6-7 minutes. Even more in particular, the first pre-determined period of time may be 1-5 minutes, preferably about 3 minutes.

The first pre-determined temperature may be any suitable temperature for the purposes of the present invention. For example, the first pre-determined temperature may be 0-50° C. In particular, the first pre-determined temperature may be 5-45° C., 10-40° C., 15-35° C., 20-30° C., 22-25° C. Even more in particular, the first pre-determined temperature may be 10-30° C., preferably about 25° C.

During the mixing, the reactants may homogenize. The mixing may be by any suitable method. For example, the mixing may be by using a rod. The mixing may also bring about an increase in the temperature of the reactants.

The heating may be carried out by any suitable method. For example, the heating may be by using a water bath. The heating may further comprise mixing the reactants during the heating.

The heating may be at suitable conditions to ensure that the PDMS begins to cross-link but avoiding gelation of the PDMS such that the PDMS remains dissolvable. Accordingly, the second pre-determined period of time and the second pre-determined temperature may be any suitable time and temperature for the purposes of the present invention. For example, the second pre-determined period of time may be 3-20 minutes. In particular, the second pre-determined period of time may be 5-18 minutes, 7-15 minutes, 10-14 minutes, 11-12 minutes. Even more in particular, the second pre-determined period of time may be 5-10 minutes, preferably about 7 minutes.

For example, the second pre-determined temperature may be 50-100° C. In particular, the second pre-determined temperature may be 55-95° C., 60-90° C., 65-85° C., 70-80° C., 72-75° C. Even more in particular, the second pre-determined temperature may be 60-80° C., preferably 75° C.

The adding the non-polar organic solvent to the heated mixture may be carried out after the heated mixture is removed from the heating source, such as a water bath. The non-polar organic solvent may be any suitable non-polar organic solvent for the purposes of the present invention. For example, the non-polar organic solvent may be, but not limited to, cyclohexane, hexane, toluene, or a combination thereof. In particular, the non-polar organic solvent may be cyclohexane.

The non-polar organic solvent added to the heated mixture may be at a suitable temperature. For example, the non-polar organic solvent added may be at a temperature lower than the boiling point of the non-polar organic solvent.

The adding the non-polar organic solvent rapidly reduces the temperature of the heated mixture, thereby slowing down the cross-linking of the PDMS. The PDMS may be partially cross-linked but remains dissolvable in the non-polar organic solvent. The adding the non-polar organic solvent may further comprise stirring the non-polar organic solvent and the partially cross-linked PDMS. In particular, upon adding the non-polar organic solvent, the partially cross-linked PDMS may dissolve in the non-polar organic solvent to form a PDMS solution.

Once the PDMS solution is formed, the PDMS solution may be stirred for a third pre-determined period of time at a third pre-determined temperature to form a mixture of highly cross-linked PDMS. The third pre-determined period of time may be any suitable time for the purposes of the present invention such that the cross-linking of the PDMS is allowed to continue. For example, the third pre-determined period of time may be 2 weeks-12 months. In particular, the third pre-determined period of time may be 3 weeks-11 months, 6 weeks-10 months, 8 weeks-9 months, 10 weeks-8 months, 12 weeks-7 months, 5-6 months. Even more in particular, the third pre-determined period of time may be 2-12 months, preferably 10 months.

The third pre-determined temperature may be any suitable temperature for the purposes of the present invention. For example, the third pre-determined temperature may be 0-40° C. In particular, the third pre-determined temperature may be 5-35° C., 10-30° C., 15-25° C., 18-22° C., 20-21° C. Even more in particular, the third pre-determined temperature may be 10-30° C., preferably 25° C.

The stirring may comprise stirring the mixture using a suitable stirrer. For example, a magnetic stirrer may be used.

The stirring may comprise monitoring the viscosity of the PDMS solution. In particular, when there is no change in viscosity of the PDMS solution, a suitable amount of additional non-polar organic solvent may be added to the PDMS solution and the PDMS solution may then be stirred. In this way, the PDMS solution may be diluted by the non-polar organic solvent. This stirring and addition of additional non-polar organic solvent may be continued until there is no further change in the viscosity of the PDMS solution even after the addition of the additional non-polar organic solvent, thereby forming a mixture of highly cross-linked PDMS.

According to a particular aspect, the third pre-determined period of time may be the total time taken from the first addition of the non-polar organic solvent to the final addition of the non-polar organic solvent.

Figure 2:
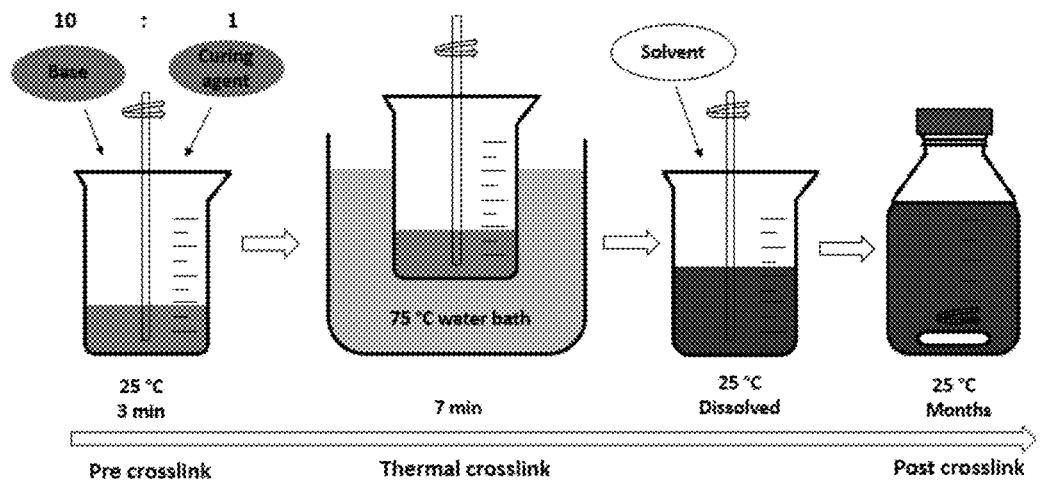
FIG. 2 shows a schematic representation of the preparation of a highly cross-linked PDMS according to one embodiment of the present invention.

A particular embodiment of the method of forming cross-linked polydimethylsiloxane (PDMS) having a molecular weight 500 kg/mol is shown in FIG. 2 and the stages of the names and synthesis conditions of different PDMS samples obtained during the method is shown in Table 1.

TABLE 1

Terminologies used and synthesis conditions of different PDMS samples during the formation of the highly cross-linked PDMS

| Code for PDMS | Synthesis conditions | Terminology used |
|---|---|---|
| 0-min | The base and the cross-linking agents were mixed for 3 minutes at room temperature, then dissolved by cyclohexane | Non cross-linked |
| 7-min | The homogenized reactants were thermally cross-linked in a 75 ± 1° C. water bath for 7 minutes, then dissolved by cyclohexane | Partially cross-linked |
| 10-month | After 7 minutes of thermal cross-linking, the PDMS solution was subjected to post cross-linking for 10 months at room temperature | Highly cross-linked |

In particular, the method of forming the highly cross-linked PDMS of the present invention may extend the cross-linking of the PDMS beyond gel point without gelation or solidification, thereby enabling an extremely large molecular network to be obtained. Accordingly, the PDMS formed from the method of the present invention may have a large molecular weight ≥100 kg/mol, preferably ≥500 kg/mol.

According to a third aspect, the present invention provides a composite hollow fiber membrane for gas and vapour separation comprising:
providing a cross-linked PDMS solution, wherein the PDMS has a molecular weight ≥100 kg/mol;
providing a porous hollow fiber membrane substrate; and
coating a surface of the porous hollow fiber membrane substrate with the cross-linked PDMS solution.

The cross-linked PDMS solution may be any suitable PDMS solution for the purposes of the present invention. In particular, the molecular weight of the PDMS may be ≥500 kg/mol. Even more in particular, the molecular weight of the PDMS may be about 577 kg/mol.

According to a particular aspect, the cross-linked PDMS solution may be prepared by the method described above. In particular, the concentration of PDMS in the cross-linked PDMS solution may be ≥0.25 weight %.

The porous hollow fiber membrane substrate used for the method of the present invention may be any suitable membrane substrate. In particular, the membrane substrate may be as described above in relation to the first aspect of the present invention. Even more in particular, the membrane substrate may be fabricated using a suitable dry-wet spinning process with suitable spinning conditions and parameters.

According to a particular aspect, the providing a porous hollow fiber membrane substrate may comprise providing a PAN hollow fiber membrane substrate. In particular, the providing a porous hollow fiber membrane substrate may comprise forming the PAN hollow fiber membrane substrate and subsequently using the PAN hollow fiber membrane substrate for the method of the present invention.

The coating may be by any suitable method. For example, the coating may comprise, but is not limited to, direct dip coating, spin coating, continuous coating, or a combination thereof. In particular, the coating of the cross-linked PDMS solution on a surface of the hollow fiber membrane substrate may be by direct dip coating.

In particular, one end of the hollow fiber membrane substrate may be sealed with a suitable fast-setting epoxy resin, while the shell side of the other end may be embedded into a holder using regular epoxy resin. The composite membrane may then be prepared by a direct dip coating process.

The method may further comprise drying the formed composite membranes following the coating. The drying may be under suitable conditions. In particular, the drying may be at room temperature for at least 2 days.

Figure 3:
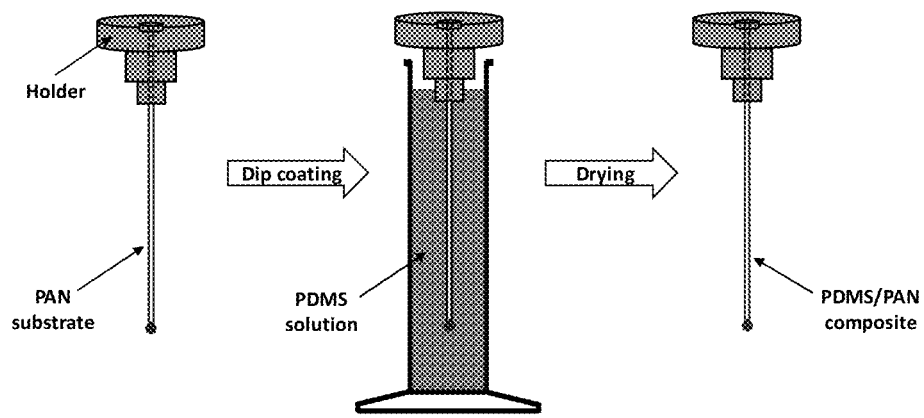
FIG. 3 shows a schematic representation of the preparation of a composite hollow fiber membrane according to one embodiment of the present invention.

A schematic representation of the direct dip coating process is shown in FIG. 3, which shows a particular example of forming a PDMS/PAN hollow fiber composite membrane, in which the membrane substrate is PAN.

Having now generally described the invention, the same will be more readily understood through reference to the following examples which is provided by way of illustration, and are not intended to be limiting.

EXAMPLE

Materials

Sylgard®184 silicone elastomer kit was purchased from Dow Corning (Singapore) Pte Ltd. Polyacrylonitrile (PAN) was obtained from Chung Yuan Christian University, Taiwan. Cyclohexane (analytical reagent grade, ≥99.99%) was supplied by Fisher Chemical. N-methyl-2-pyrrolidone (NMP, ≥99.5%) and polyethylene glycol (PEG)/polyethylene oxide (PEO) were bought from Merck. Deionized (DI) water was produced by a water purification system (Millipore, Elix). Gases including oxygen ($O_2$, ≥99.9995%), nitrogen ($N_2$, ≥99.9995%), carbon dioxide ($CO_2$, ≥99.95%) and pure air used in this work were supplied by Singapore Oxygen Air Liquide Pte. Ltd. (SOXAL). Pure air mainly consisted of $N_2$ and $O_2$ (i.e., $O_2$=21±1%, $H_2O$<3 ppm, $C_nH_m$<5 ppm)

Synthesis of Cross-Linked PDMS

Cross-linked PDMS was synthesized using a Sylgard®184 silicone elastomer kit, which primarily consists of an elastomer base and a cross-linking or curing agent. The method of synthesizing the cross-linked PDMS contains 3 steps with details as following: Firstly, a reaction mixture consisting of a 10:1 weight ratio of the base to the cross-linking agent was stirred manually in a 50 ml polypropylene beaker using a plastic rod at room temperature (~25° C.) for 3 minutes to homogenize the reactants. Secondly, the beaker containing the homogeneous mixture was placed into a 75±1° C. water bath, then stirred for 7 minutes. The beaker was then removed from the water bath and a specific amount of cool cyclohexane at ~25° C. was poured into the beaker. Subsequently, the cross-linked PDMS was cooled down, stirred and dissolved. Thereby, a 15 weight % PDMS solution was obtained and subjected to post cross-link and treatments. Finally, the 15 weight % PDMS solution was agitated using a magnetic stirrer (2Mag-Magnetic eMotion, MIX 15 eco) at room temperature. When the magnetic stirring bar stopped rotating after weeks, additional cyclohexane was added to dilute the 15 weight % stock solution to 10 weight %. Likewise, the solution was monitored and diluted to 5 weight % until there was no change in viscosity (i.e., roughly indicated by the rotation speed of the magnetic stirring bar). The stirring-diluting procedure proceeded for 10 months at room temperature. Three types of PDMS were prepared and studied in detail, the corresponding code names and preparation conditions are as shown in Table 1.

Preparation of Hollow Fiber Membrane Substrates

A dry-wet spinning process was employed to fabricate single-layer PAN hollow fiber substrates. To obtain fibers with different surface porosities and pore sizes, PAN/NMP dopes with various PAN concentrations were prepared. A mixture of $H_2O$/NMP=10/90 (weight %) was used as the bore fluid to produce porous structures to minimize the gas transport resistance. The detailed spinning conditions and parameters are compiled in Table 2.

TABLE 2

Spinning parameters for PAN hollow fiber membranes

| Spinneret dimension (mm) | OD/ID = 1.6/1.05 | | | | |
|---|---|---|---|---|---|
| Air gap (cm) | 5 | | | | |
| Take up speed (m/min) | 15 | | | | |
| External coagulant | Tap water | | | | |
| Coagulant bath temperature (° C.) | 25 ± 2 | | | | |
| Dope and bore fluid temperature (° C.) | 25 ± 2 | | | | |
| Bore fluid flow rate (ml/min) | 2.5 | | | | |
| Bore fluid composition (weight %) | $H_2O$/NMP = 10/90 | | | | |
| Polymer dope flow rate (ml/min) | 5.0 | | | | |
| Polymer dope composition (PAN/NMP, weight %) | 15/85 | 17.5/82.5 | 20/80 | 22.8/77.5 | 25/75 |
| Code name of the membrane | PAN-15 | PAN-17.5 | PAN-20 | PAN-22.5 | PAN-25 |

The procedures to spin hollow fiber substrates are described as follows. (1) Dope preparation: the PAN polymer was dried in a vacuum oven at 60° C. for 48 hours prior to use, then the formulated PAN/NMP was fed into a 3-neck glass round-bottom flask. The PAN/NMP mixture was stirred continuously with a mechanical stirrer (IKA®, EUROSTAR, EURO-ST D) at 60° C. overnight. Then the dissolved and homogenized dope was left standing still for degassing overnight. (2) Spinning: the dope and bore fluid were poured into ISCO pumps and degassed overnight. Then, the hollow fiber membrane was spun. (3) The as-spun hollow fibers were cut and stored in a water bath for 3 days with water change every day to remove the residual solvent. (4) The hollow fiber substrates were then freeze-dried using a freeze dryer (CHRIST, Beta 2-8 LDplus) for 48 hours and stored for subsequent characterizations, modifications and tests.

Fabrication of PDMS/PAN Composite Membrane

The membrane module containing one single hollow fiber was fabricated as follows. Briefly, as shown in FIG. 3, one end of the hollow fiber was sealed with a fast-setting epoxy resin (Araldite®, Switzerland), while the shell side of the other end was embedded into an aluminum holder using a regular epoxy resin. PDMS/PAN composite membranes were made by a direct dip coating process as presented in FIG. 3. The substrate was dipped into the PDMS solution for a few seconds, then taken out and dried in air at room temperature for at least 2 days. After drying, the composite membrane module was ready for gas permeation tests and other characterizations.

Properties of Cross-Linked PDMS

Figure 4A:
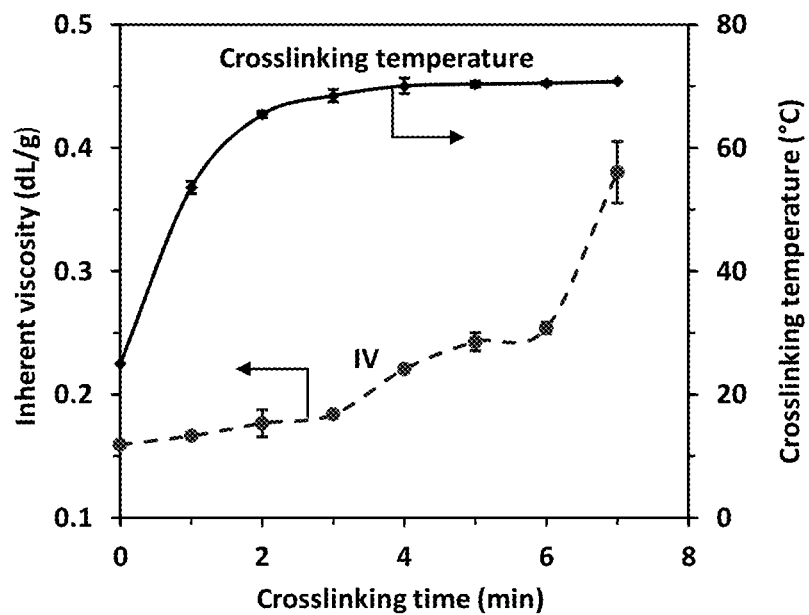
FIG. 4A shows the inherent viscosity (IV) and cross-linking reaction temperature as a function of cross-linking time at the thermal cross-linking stage of the PDMS solution.

FIG. 4A shows the evolution of inherent viscosity (referred to as IV thereafter) of the PDMS solution and the reaction temperature during the thermal cross-linking reaction. The reactants' temperature increased rapidly and reached a plateau at 70° C. after 3 minutes, while the corresponding IV of PDMS rose gradually. Then IV increased exponentially after the sixth minute. This suggests that the cross-linking reaction was approaching gel point, at which it started to form a macroscopic three-dimensional PDMS network with extension across the entire mixture and co-existing with the remaining reactants. The sample was then removed from the water bath and dissolved in cyclohexane at the seventh minute prior to gelation to avoid the full solidification. Since the chemical gelation usually takes place before all the reactants are bound together or reacted, the cross-linking reaction continued after the thermal cross-link.

Figure 4B:
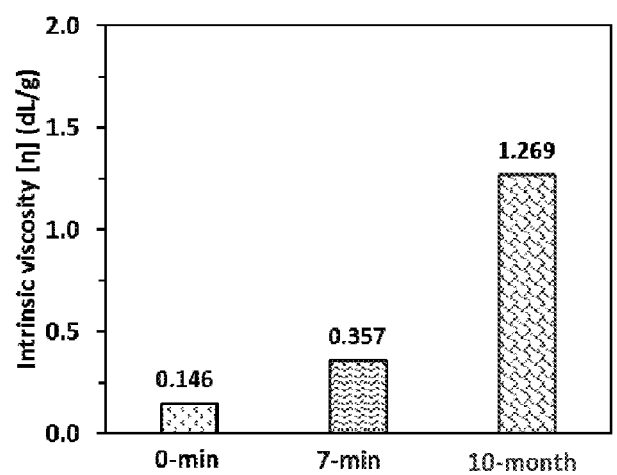
FIG. 4B shows the IV of deferment PDMS samples with different synthesis conditions.
Figure 4C:
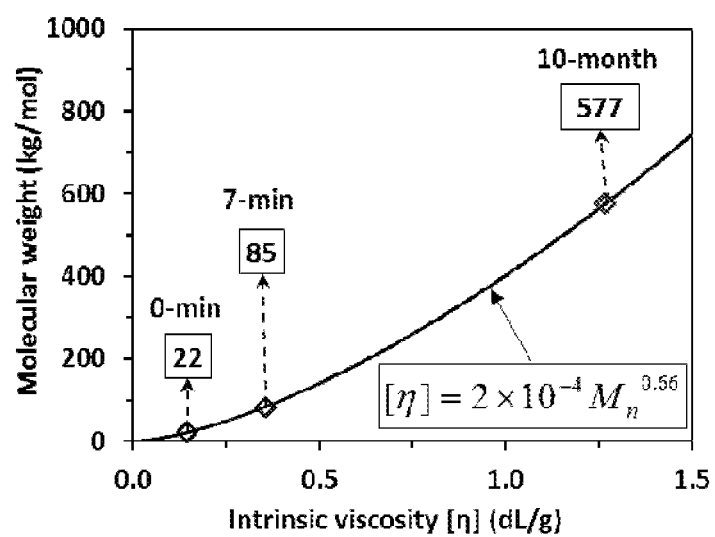
FIG. 4C shows the number average molecular weight ($M_n$) versus the intrinsic viscosity.

FIG. 4B summarizes the IV values of PDMS solutions prepared from 0-min, 7-min and 10-month cross-linking durations. Compared to the non cross-linked PDMS (0-min), the IV values of the thermal cross-linked (7-min) and post cross-linked PDMS (10-month) jumped from 0.146 to 0.357 and 1.269 dL/g, respectively. In other words, their IV increased about 2 times and 8 times, respectively. Interestingly, IV can be significantly enhanced without showing gelation in the post cross-linking method. As shown in FIG. 4C, an extremely large molecular weight (577 kg/mol) that is 26 times larger than the initial value, was achieved by applying the post cross-linking method.

Morphology of Hollow Fiber Substrates

Beside the need to have strong mechanical strength, the desired hollow fiber membrane substrate should have (1) a highly porous bulk structure, (2) a fully porous inner layer, and (3) a thin and smooth outer surface with a high surface porosity but small surface pores. These characteristics may minimize gas transport resistance across the membrane. To achieve such desirable properties, PAN hollow fiber membrane substrates were spun from different PAN concentrations. An $H_2O$/NMP mixture of 10/90 weight % was chosen as the bore fluid in order to produce a highly porous bulk structure consisting of a fully porous inner surface and a thin but porous outer layer. FIGS. 5A-5C show their morphologies as a function of PAN concentration. The morphologies of the membrane substrates were analyzed using field emission scanning electron microscopy (FESEM JEOL JSM-6700LV). The hollow fiber membrane substrates were immersed in liquid nitrogen and then fractured for sample preparation. Then, the samples were attached to FESEM stubs and coated using a platinum (Pt) sputter coater (JEOL JFC-1300).

These membrane substrates possess a honeycomb-like structure in the cross-section, a porous inner surface and a thin outer skin layer. With an increase in PAN concentration, the bulk structure of substrates becomes less porous, while the outer skin becomes thicker and denser. It can be seen in FIGS. 5A and 5B, the sponge-like structure increases with an increase in PAN concentration.

Physical and Mechanical Properties of Hollow Fiber Membrane Substrates

The mean pore size of membranes was determined based on the solute transport theory. In this work, PEG/PEO (Mw=2000; 4000; 12000; 35000; 1000000 g/mol) were used as the neutral solutes, solutions with 200 ppm PEG/PEO in DI water were prepared for the ultrafiltration (UF) experiments. The solute concentration was determined by using a total organic carbon analyzer (Shimadzu, TOC ASI-5000A).

The modules comprising PAN hollow fiber substrates were prepared. Each module contained three fibers, each fiber had an effective length of 16 cm. Two modules were tested for each spinning condition. DI water was used to determine the pure water permeation (PWP, L/$m^2$h bar) according to the following equation:

$$PWP = \frac{Q}{A\Delta P} \quad (1)$$

where Q is the water permeation rate (liter/hour=L/h), A is the effective filtration area ($m^2$) and $\Delta P$ is the transmembrane pressure (bar)

Figure 6A:
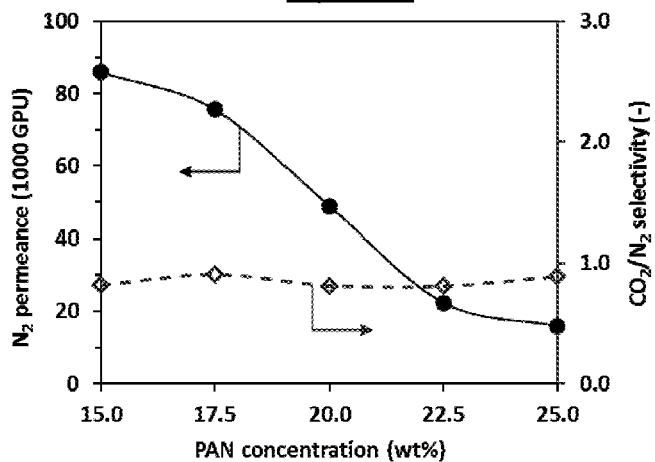
FIG. 6A shows the $N_2$ permeance and $CO_2/N_2$ selectivity of the substrates.
Figure 6B:
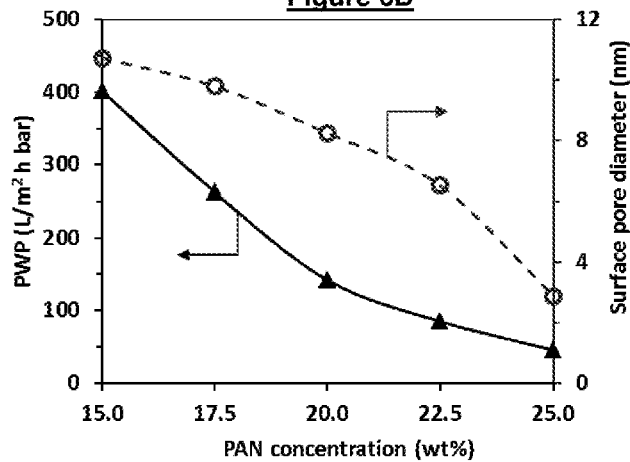
FIG. 6B shows the pure water permeation (PWP) and average surface pore size.
Figure 6C:
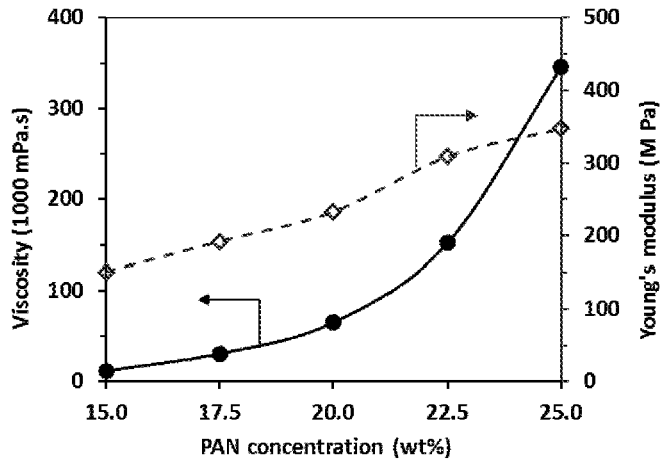
FIG. 6C shows the viscosity of spinning dopes and Young's modulus of fibers as a function of PAN concentration.

FIGS. 6A-6C illustrate the effects of PAN concentration on physicochemical properties of membrane substrates such as FIG. 6A: gas permeance and $CO_2/N_2$ selectivity, FIG. 6B: PWP and pore size and FIG. 6C: dope viscosity and Young's modulus.

The pure gas permeance, J, in GPU (1 GPU=1×$10^{-6}$ $cm^3$ (STP)/$cm^2$ s cmHg), can be determined according to the following equation:

$$J = \frac{P}{L} = \frac{Q}{A\Delta P} = \frac{Q}{n\pi D L_m \Delta P} \quad (2)$$

where Q is the gas permeate flow rate ($cm^3$/min), n is the number of fibers in each module, D is the outer diameter of hollow fiber membranes (cm), $L_m$ is the effective length of hollow fibers on the module (cm) and $\Delta P$ is the pressure difference across the membrane (cmHg).

The pure gas permselectivity ($\alpha_{i/j}$) is defined as:

$$\alpha_{i/j} = \frac{(P/L)_i}{(P/L)_j} \quad (3)$$

where $(P/L)_i$ and $(P/L)_j$ are the permeances of gases i and j, respectively.

Gases flowing through these porous membrane substrates were under the Knudsen diffusion because the $CO_2/N_2$ selectivity is less than one. The $N_2$ permeance dropped from about 85000 to 15000 GPU as the PAN concentration increased from 15 weight % to 25 weight %. The significant decrease in $N_2$ permeance may be attributed to the rapid rise in the polymer dope viscosity (FIG. 6C). Since the membrane substrates were formed due to the mutual diffusion between the solvent (NMP) and non-solvent (water) during the phase inversion, a PAN dope with a higher concentration and viscosity would retard the mutual diffusion, thereby forming a denser outer surface. As a result, the gas permeance, surface pore size, and pure water permeation (PWP) decreased monotonically with the augment of PAN concentration, as illustrated in FIGS. 6A and 6B. It can be visualized from FIG. 5C that the surface porosity of the substrates decreased with an increase in PAN concentration.

Both the tensile strength and modulus rose with increasing PAN concentration because the sponge-like structure was mechanically stronger than the finger-like macrovoid structure. Since a small surface pore would reduce the intrusion of PDMS solutions during coating, while a high surface porosity could enhance the permeation area, an ideal membrane substrate must have an outer surface consisting of small pores and a high surface porosity. However, in reality, there is a trade-off between the surface pore size and surface porosity, a membrane with a small surface pore size tends to have a low surface porosity and vice versa.

Properties of the PDMS/PAN Composite Membranes

The permselectivity of $CO_2/N_2$ were employed to evaluate the coating effectiveness of the PDMS/PAN composite membranes. If the gas permselectivity was equal or close to the intrinsic permselectivity of the dense PDMS film, the composite membrane is defect-free. In order to evaluate the effects of cross-linking time on PDMS, the PAN-20 substrate was chosen for the coating because it had a moderate surface pore size and good mechanical properties. FIGS. 7A-7D show the performance of PDMS/PAN composite membranes fabricated by dip coating: (1) PAN-20 substrates in three different PDMS solutions; and (2) different PAN substrates in the PDMS (10-month) solution. As shown in FIGS. 7A-7D, all fabricated PDMS/PAN composite membranes have a $CO_2/N_2$ selectivity of 11.6±1, which is equal/close to the intrinsic permselectivity of the dense PDMS film. Therefore, these composite membranes are defect-free.

Figure 7A:
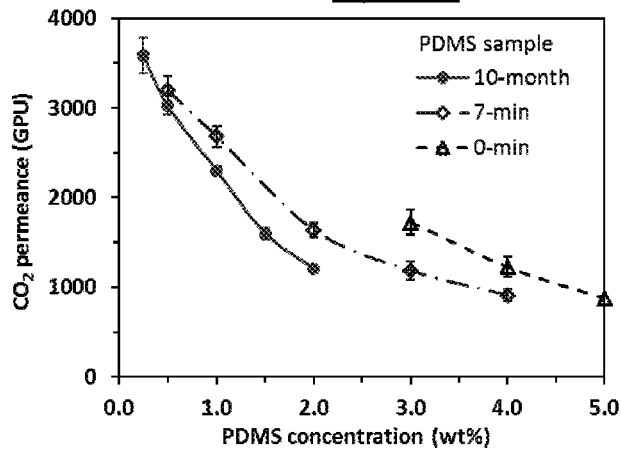
FIG. 7A shows the effects of cross-linking time on $CO_2$ permeance using the PAN-20 substrate.
Figure 7B:
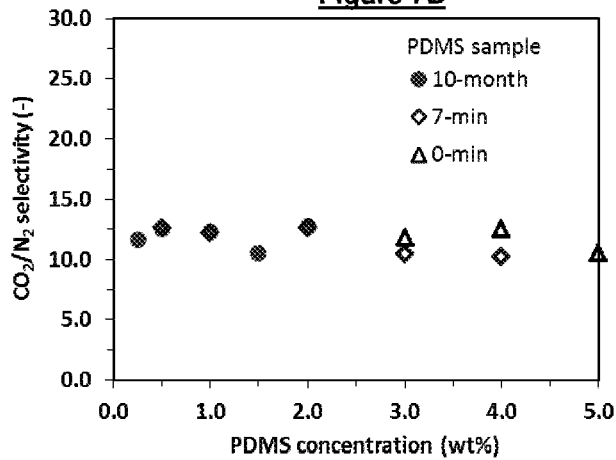
FIG. 7B shows the $CO_2/N_2$ selectivity of the PDMS/PAN composite membranes fabricated with the PAN-20 substrate.

FIG. 7A compares the $CO_2$ permeances after being coated with different PDMS solutions. For each PDMS solution (e.g. either 0-min, 7-min or 10-month), the $CO_2$ permeance of the resultant membranes decreased with an increase in PDMS concentration because the coated PDMS thickness increased with an increase in polymer concentration. Among the three PDMS solutions, the membrane coated with a higher IV PDMS exhibited a lower $CO_2$ permeance than that coated with a low IV one even though they have the same PDMS concentration. This was because the PDMS solution with a higher IV had a higher bulk viscosity at a given concentration. Consequently, a higher bulk viscosity led to a thicker PDMS coating layer and a lower gas permeance.

For the PAN-20 substrate, the minimum PDMS concentration to prepare a defect-free membrane with the 10-month PDMS was 0.25 weight %, which was at least 10 times lesser than prior art methods using non cross-linked PDMS (0-min) and the traditional methods to prepare the PDMS composite membranes. The reason is that the 10-month PDMS has a much larger molecular network (evidenced by a much higher IV in FIG. 4B) which is able to completely cover the surface pores (~10 nm in diameter, see FIG. 6B) without much intrusion. As can be seen from FIG. 7A, the composite membrane coated by 0.25 weight % PDMS (10-month) has a $CO_2$ permeance of about 3600 GPU and a thin PDMS selective layer of 214 nm.

Figure 7C:
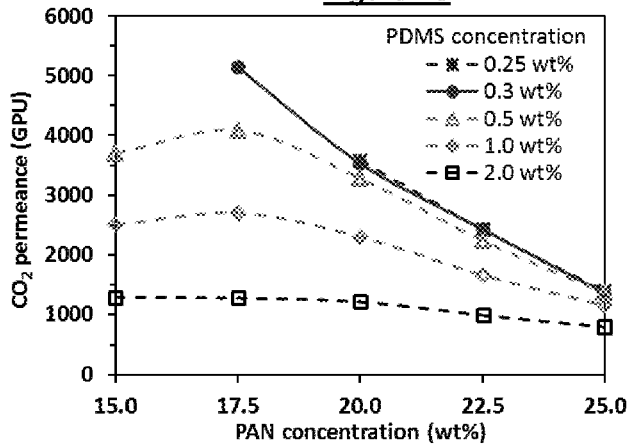
FIG. 7C shows the effects of PAN and PDMS concentrations on $CO_2$ permeance using the PDMS (10-month) and FIG. 7D shows the $CO_2/N_2$ selectivity of the PDMS/PAN composite membranes fabricated with different substrates.
Figure 7D:
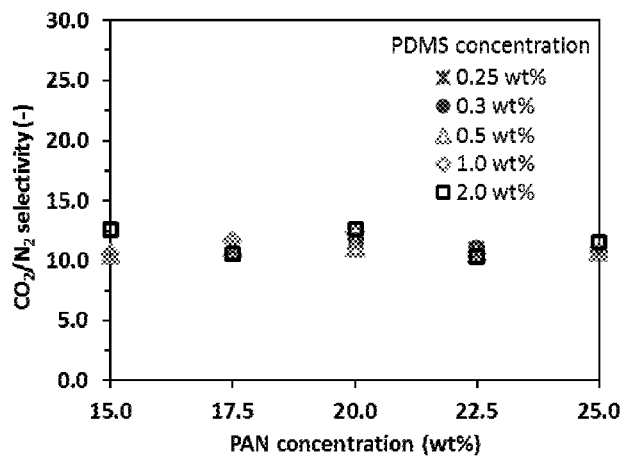

The following illustrates the approach to optimize surface pore size, reduce intrusion and increase permeance by using the same PDMS (10-month) but manipulating (1) its coating concentration and (2) PAN concentration in spinning dopes. FIG. 7C shows the $CO_2$ permeance of the resultant composite fibers as a function of PDMS and PAN concentrations. Three phenomena can be observed. When using 0.3 weight % PDMS as the coating solution, the permeance reached the maximum value of 5138 GPU if PAN-17.5 (i.e., spun from 17.5 weight % PAN) was employed. However, the same PAN membrane coated by a 0.25 weight % PDMS solution was defective because its $CO_2/N_2$ selectivity was less than 9 (not shown in the figure). This arose from the fact that the PAN-17.5 membrane had too big pores (e.g. ≥10.7 nm in FIG. 6B) to be coated by the 0.25 weight % PDMS solution. Since PAN-15.0 membrane had bigger pores than that of the PAN-17.5, more intrusion occurred when 0.5 and 1.0 weight % PDMS solutions were coated on PAN-15.0 substrate, leading to lower permeance. As a result, the optimal PAN concentration is 17.5 weight % when using 0.5 and 1.0 weight % PDMS as the coating solutions. In contrast, the 2.0 weight % PDMS has higher viscosity and can effectively coat the PAN-15.0 substrate with less intrusion so that the permeance increases with a decrease in PAN concentration. Table 3 presents a comparison of PDMS composite membranes for gas separation. The composite membrane made from 0.3 weight % PDMS and PAN-17.5 has the highest $CO_2$ permeance of 5138 GPU in the literature using PDMS as the selectivity in hollow fibers.

Optimal PDMS/PAN Composite Membrane

Figure 8:
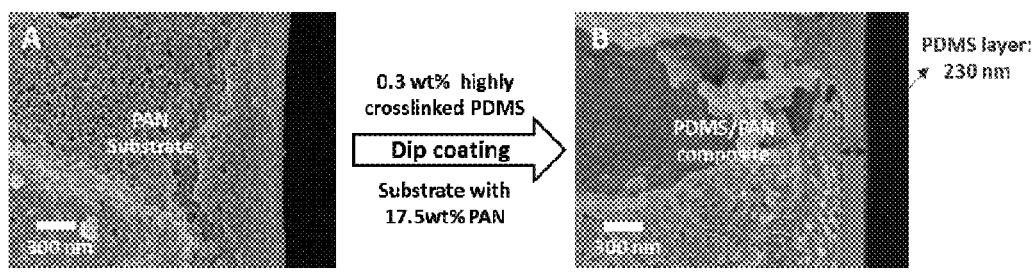
FIG. 8 shows an illustration of fabricating the optimal PDMS/PAN composite membrane.

As presented in FIG. 8, the optimal PDMS/PAN composite membrane may be produced by dip coating method using 0.3 weight % highly cross-linked PDMS (10-month) as the coating solution and PAN-17.5 as substrate (spun from 17.5 weight % PAN).

Gas Permeation and Separations

Figure 9:
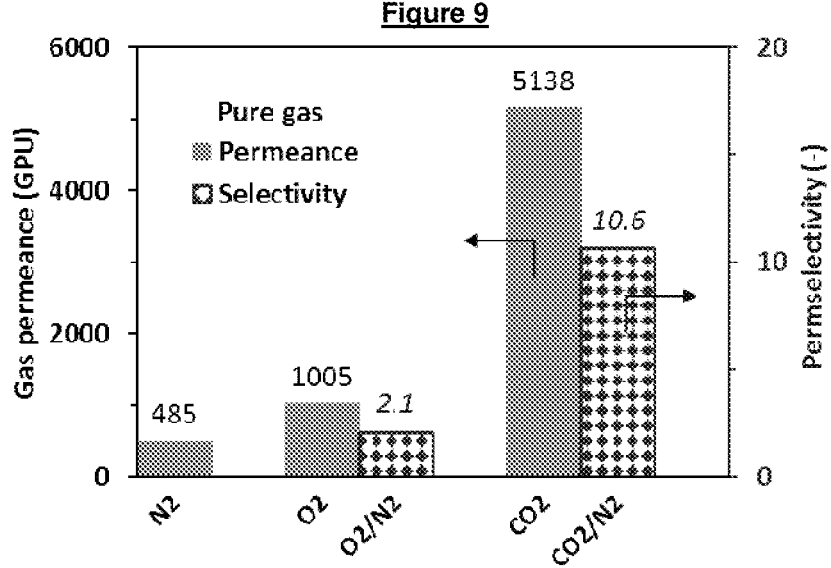
FIG. 9 shows the gas separation performances of the optimal PDMS/PAN composite membrane coated by 0.3 weight % highly cross-linked PDMS (10-month), tested at a feed pressure of 2 bar.

Since the 0.3 weight % PDMS/PAN-17.5 composite membrane had the highest $CO_2$ permeance, it was chosen for pure and mixed gas tests. FIG. 9 presents its pure gas separation performance. It has an $O_2$ permeance of about 1000 GPU and an $O_2/N_2$ permselectivity of 2.1, which is equal to the intrinsic permselectivity of PDMS. Thus, the newly prepared composite membrane was confirmed as defect-free. This composite membrane had a $CO_2$ permeance more than 5000 GPU with a moderate $CO_2/N_2$ selectivity of 10.6.

Figure 10A:
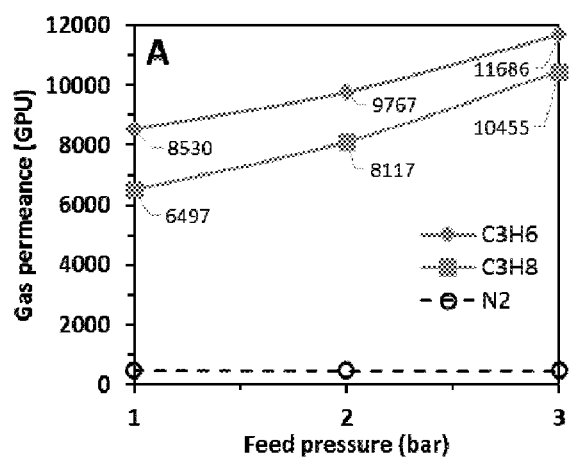
FIG. 10A shows the pure gases permeance of the composite membrane versus feed pressure and FIG. 10B shows the pure gases permselectivity of the composite membrane versus feed pressure.
Figure 10B:
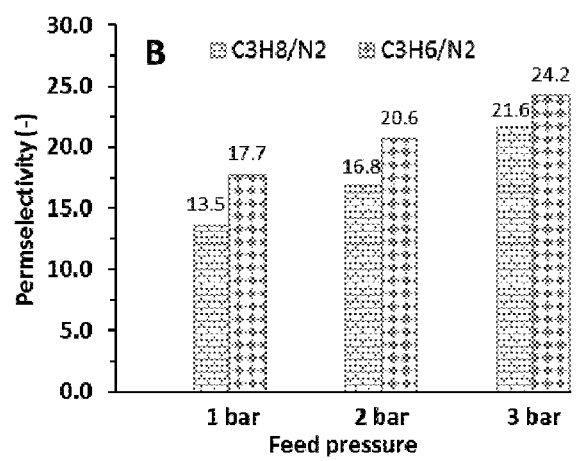

FIGS. 10A and 10B show that $C_3H_8$ and $C_3H_6$ permeance increased with the increment in feed pressure. $C_3H_8$ permeance increased from about 6500 at a feed pressure of one bar to around 10000 GPU at a feed pressure of three bar. $C_3H_6$ permeance increased from about 8500 at a feed pressure of one bar to around 11000 GPU at a feed pressure of three bars. Meanwhile, the $N_2$ permeance remained almost constant. As a result, the corresponding $C_3H_8/N_2$ and $C_3H_6/N_2$ permselectivity increased accordingly. The increase of $C_3H_8$ and $C_3H_6$ permeances with the increase of feed pressure was attributed to the high condensability of $C_3H_8$ and $C_3H_6$.

TABLE 3

A comparison of PDMS composite membranes for gas separation

| Membrane | | Testing conditions | | Pure gas permeance (GPU) | | | Perselectivity | | Reference |
|---|---|---|---|---|---|---|---|---|---|
| Configuration | Composite | Pressure (bar) | Temperature (° C.) | $N_2$ | $O_2$ | $CO_2$ | $O_2/N_2$ | $CO_2/N_2$ | |
| Hollow fiber | PDMS/PAN | 2 | 25 | 485 | 1005 | 5138 | 2.1 | 10.6 | This work |
| Hollow fiber | PDMS/PES | 13.6 | 25 | 2.2 | 11.3 | — | 5.3 | — | Y. Li et al, Journal of Membrane Science, 2004, 245: 53-60 |

TABLE 3-continued

A comparison of PDMS composite membranes for gas separation

| Membrane | | Testing conditions | | Pure gas permeance (GPU) | | | Perselectivity | | |
|---|---|---|---|---|---|---|---|---|---|
| Configuration | Composite | Pressure (bar) | Temperature (°C.) | $N_2$ | $O_2$ | $CO_2$ | $O_2/N_2$ | $CO_2/N_2$ | Reference |
| Hollow fiber | PDMS/PSf | 13.6 | 25 | — | 31 | 200 | 5.1 | 33.3 | D. Wang et al, J. Membr. Sci., 2002, 204: 247-256 |
| Hollow fiber | PDMS/PES-PI | 4 | 25 | — | — | 60 | — | 39 | G. C. Kapantaidakis and G. H. Koops, J. Membr. Sci., 2002, 204: 153-171 |
| Hollow fiber | PDMS/PAN | 1 | 25 | 370 | 860 | 3700 | 2.3 | 10 | P. Li et al, J. Membr. Sci., 2013, 434: 18-25 |
| Hollow fiber | PDMS/PAN | 2 | 25 | — | 377 | 1926 | 2 | 10.4 | H. Z. Chen et al, Int. J. Hydrogen Energy, 2014, 39: 5043-5053 |
| Hollow fiber | PDMS/PSF | 5 | 25 | 2 | — | 64 | — | 32 | A. K. Zulhairun et al, Sep. Purif. Technol., 2015, 146: 85-93 |
| Flat sheet | PDMS/PAN | 3.4 | 35 | 290 | — | 2880 | — | 10 | Q. Fu et al, Energy Environ. Sci., 2016, 9: 434-440 |
| Flat sheet | PDMS/PAN | 3.5 | 35 | 320 | — | 2865 | — | 9 | J. Kim et al, Nanoscale, 2016, 8: 8312-8323 |
| Flat sheet | PDMS/PAN | 3.5 | 35 | — | — | 4050 | — | 9 | J. M. P. Scofield et al, J. Membr. Sci., 2016, 499: 191-200 |

From the above, it can be seen that the PDMS having a large molecular weight of about 577 kg/mol is able to bridge and cover the surface pores at very low concentration (e.g. 0.3 weight %), while without causing a defect on the thin film composite hollow fiber membrane.

Further, the present invention provides a PDMS/PAN composite membrane which may be fabricated by a simple dip coating process without requiring any pre-treatment.

Whilst the foregoing description has described exemplary embodiments, it will be understood by those skilled in the technology concerned that many variations may be made without departing from the present invention.

The invention claimed is:

1. A composite hollow fiber membrane for gas and vapour separation comprising:
   a porous membrane substrate; and
   a selective layer of cross-linked polydimethylsiloxane (PDMS) provided on the surface of the porous membrane substrate, wherein the molecular weight of the cross-linked PDMS is ≥500 kg/mol, and the selective layer is formed from a solution containing 0.25-0.30 weight % of the cross-linked PDMS.

2. The composite hollow fiber membrane according to claim 1, wherein the cross-linked PDMS has a thickness of ≤3 μm.

3. The composite hollow fiber membrane according to claim 1, wherein the membrane has a $O_2$ permeance of ≥1,000 GPU.

4. The composite hollow fiber membrane according to claim 1, wherein the membrane has a $CO_2$ permeance of ≥5,000 GPU.

5. The composite hollow fiber membrane according to claim 1, wherein the membrane has a selectivity of $O_2/N_2$ of about 2 at a temperature of 25° C. and pressure of 2 bar.

6. The composite hollow fiber membrane according to claim 1, wherein the membrane has a selectivity of $CO_2/N_2$ of about 11 at a temperature of 25° C. and pressure of 2 bar.

7. The composite hollow fiber membrane according to claim 1, wherein the porous membrane substrate comprises polyacrylonitrile (PAN), polyethersulfone (PES), polysulfone (PSF), cellulose acetate (CA), polyvinylidene fluoride (PVDF), or copolymers thereof.

8. A method of forming cross-linked polydimethylsiloxane (PDMS) having a molecular weight ≥100 kg/mol, the method comprising:
   mixing a PDMS elastomer base and a cross-linking agent for a first pre-determined period of time at a first pre-determined temperature to form a first mixture, heating the first mixture at a second pre-determined temperature for a second pre-determined period of time, adding a non-polar organic solvent to the heated mixture to form a solution of partially cross-linked PDMS and, stirring the solution of partially cross-linked PDMS for a third pre-determined period of time at a third pre-determined temperature to form a mixture of highly cross-linked PDMS.

9. The method according to claim 8, wherein the first pre-determined period of time is 3-10 minutes and the first pre-determined temperature is 0-50° C.

10. The method according to claim 8, wherein the second pre-determined period of time is 3-20 minutes and the second pre-determined temperature is 50-100° C.

11. The method according to claim 8, wherein the third pre-determined period of time is 2 weeks-12 months and the third pre-determined temperature is 0-40° C.

12. The method according to claim 8, wherein the non-polar organic solvent is selected from the group consisting of cyclohexane, hexane, toluene, and a combination thereof.

13. A method of forming the composite hollow fiber membrane of claim 1, the method comprising:

providing a cross-linked PDMS solution, wherein the PDMS has a molecular weight ≥500 kg/mol and the solution contains 0.25-0.30 weight % of the cross-linked PDMS;

providing a porous hollow fiber membrane substrate; and coating a surface of the porous hollow fiber membrane substrate with the cross-linked PDMS solution.

14. The method according to claim 13, wherein the cross-linked PDMS solution is prepared by the method of claim 8.

15. The method according to claim 13, wherein the coating comprises direct dip coating, spin coating, continuous coating, or a combination thereof.

16. The method according to claim 13, further comprising drying the coated porous hollow fiber membrane substrate following the coating.

17. The method according to claim 16, wherein the drying is at room temperature for at least 2 days.

* * * * *